United States Patent [19]

Seaburg

[11] Patent Number: 4,833,700
[45] Date of Patent: May 23, 1989

[54] MOBILE PHONE INTERFACE

[76] Inventor: Stephen L. Seaburg, 4021 Cedar Run Rd., Traverse City, Mich. 49684

[21] Appl. No.: 74,929

[22] Filed: Jul. 17, 1987

[51] Int. Cl.$^4$ .............................................. H04Q 7/04
[52] U.S. Cl. ...................................... 379/58; 379/61; 455/90
[58] Field of Search ...................... 379/144, 61, 62, 58; 455/90

[56] References Cited

U.S. PATENT DOCUMENTS

| 3,449,750 | 6/1969 | Sweigert | 379/61 |
| 3,476,882 | 11/1969 | Vogelman et al. | 379/61 |
| 3,803,366 | 4/1978 | Ishii et al. | 379/61 |
| 3,919,491 | 11/1975 | Luce | 379/61 |
| 4,005,269 | 1/1977 | Willis | 379/61 |

FOREIGN PATENT DOCUMENTS 204640 11/1983 Japan ...................................... 379/58

OTHER PUBLICATIONS

Seki et al, "Detachable Unit Service in 800 MHz–Band Cellular Radiotelephone System". IEEE Communications Magazine, 2/86, vol. 24, No. 2.

Primary Examiner—Robert Lev
Attorney, Agent, or Firm—Douglas S. Bishop

[57] ABSTRACT

An interface for establishing telephonic communication between a transceiver disposed within the interior of a vehicle and an externally disposed telephone station includes a cradle adapted to retain the handset of the external telephone station, receive signals therefrom, and transmit those signals to the internal transceiver. The handset cradle is further adapted to receive electrical signals from the internal transceiver and transmit them to the external handset. In this manner, full duplex telecommunication is achieved. The invention may further include provisions for establishing wireless communication between the internal transceiver and the handset cradle, and may be specifically adapted to link an external telephone system to a telephone station within the interior of a motor home or truck. The invention was registered under the Disclosure Document Program as Disclosure Document No. 165429.

18 Claims, 4 Drawing Sheets

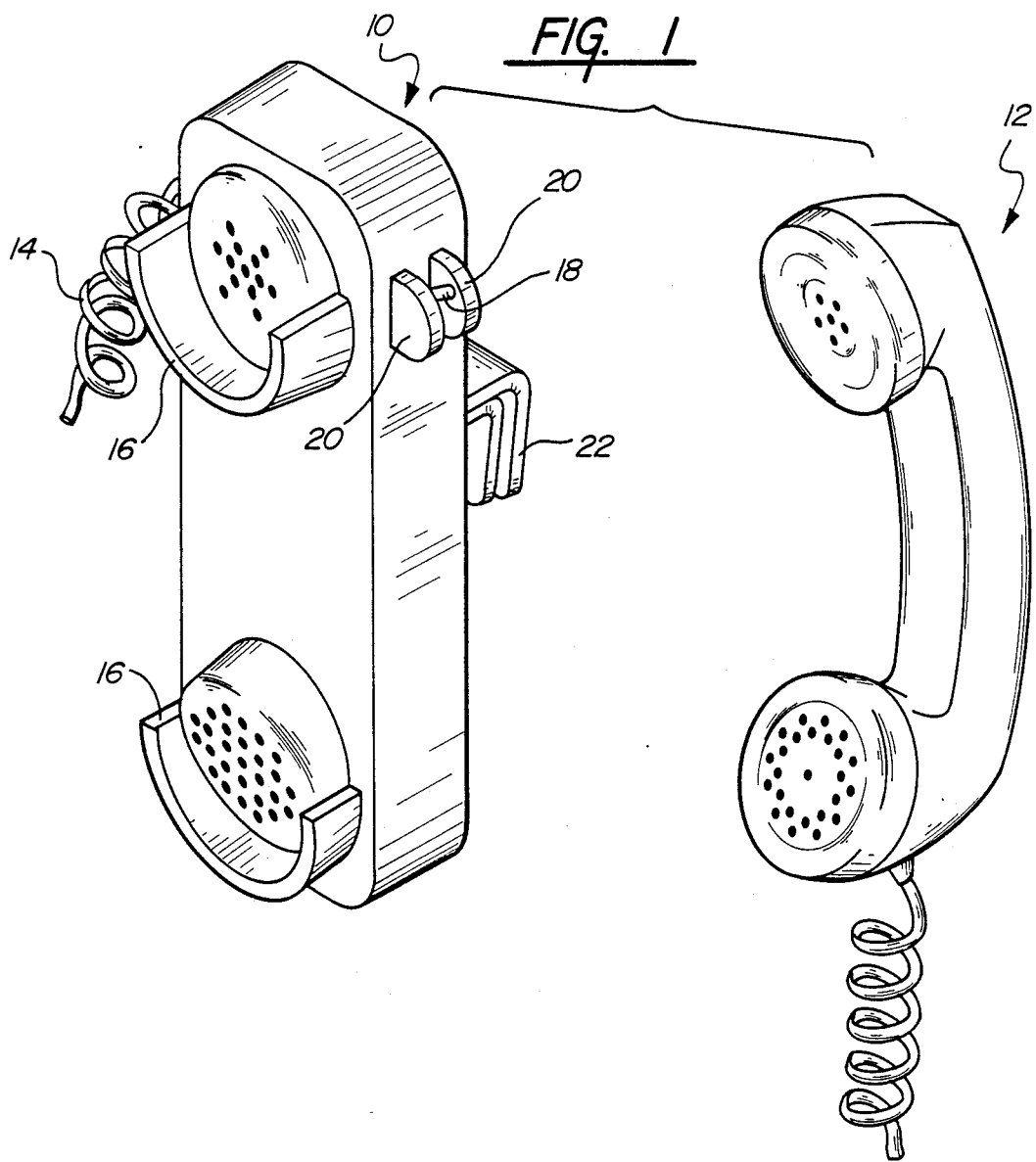
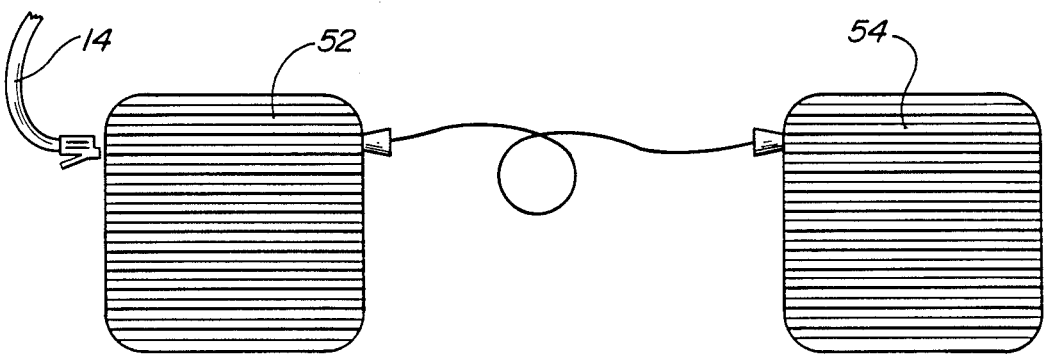

4,833,700

MOBILE PHONE INTERFACE

FIELD OF THE INVENTION

This invention relates generally to telephony and in particular to an interface adapted to allow a telephone disposed within a vehicle to be coupled to the handset of an externally disposed telephone such as a pay phone.

BACKGROUND OF THE INVENTION

Ever since the inception of the telephone, its use has grown dramatically year by year. At the present, the telephone is an essential tool for business and is in very widespread use in social and recreational settings. During roughly the same period of time vehicular travel has also increased dramatically both for purposes of business and pleasure. Because of the rapid growth of these two technologies and the overlap in their fields of use, it is natural that telephony and motor travel should coincide in many ways. In a business setting it is often necessary to make telephone calls while on the road, as for example to confirm meetings, secure directions and establish schedules. Likewise, in social and recreational settings it is necessary to make calls for similar reasons.

In response to the ever growing need of an increasingly mobile society to maintain a high degree of telephonic communication, public roadside phones have come into widespread use. Such phone stations usually consist of a pay telephone mounted in close proximity to the roadside and at a relatively low level so as to enable "drive-up" use.

Problems frequently occur in the use of such roadside telephones. Generally the cord linking the handset to the telephone station is made relatively short so as to prevent drivers from inadvertently departing with the handset within the vehicle. Because of the shortness of the cord it is necessary to fully lower the vehicle window in order to utilize the telephone. Additionally, the caller must remain the quite close proximity to the open window, and in some instances even lean out of the vehicle. This obviously presents many inconveniences particularly in inclement weather. The open window allows escape of heated or cooled air from the vehicle, allows entry of rain or snow thereinto and furthermore creates a relatively noisy calling environment insofar as road noise enters the vehicle. The short telephone cord also presents a further limitation insofar as passengers in the vehicle find it difficult or impossible to utilize the telephone. The short telephone cord also creates problems when drivers of trucks, busses, motor homes or other such oversize vehicles attempt to utilize roadside telephones.

In addition to the problems occasioned by relatively short cords on public roadside telephones, additional concerns arise pertaining to the transmission of infectious disease via handsets of public telephones. It is known that viruses responsible for colds, influenza and various other diseases can survive for various lengths of time upon environmental surfaces and consequently such contaminated surfaces can be sources of contagion. Accordingly, it is desirable to limit close physical contact with such surfaces.

It will thus be appreciated than, that there is a need for establishing telephone calling capabilities from the interior of a vehicle, which capabilities are not limited by the physical constraints of public telephone stations, and which do not require prolonged exposure of the vehicle interior to inclement or possibly adverse environmental conditions, and which also limit user exposure to potentially infectious surfaces.

Mobile ratio-telephone systems, commonly referred to as cellular telephones, are one solution to the foregoing problems and are presently enjoying growing public use. However, such systems tend to be very expensive and full network coverage is not available in certain parts of the country. Accordingly cellular phone systems represent only a partial solution to the foregoing problem.

What is needed is a relatively low cost device which will enable use of public vehicular telephone stations while eliminating the foregoing problems. Accordingly, there is needed a device which will enable a telephone transceiver disposed within a vehicle to interface with an external telephone station. In this manner, communication can be established via internally disposed telephone transceiver equipment thus avoiding opening the interior of the vehicle to the external environment. Such internal transceiver equipment can be disposed so as to be accessible to all passengers therewithin. It is also preferred that any such interface equipment be relatively small and portable so as to allow for ready transport from vehicle to vehicle, be low in cost and be relatively rugged.

Previously, there have been developed certain specific systems for connecting auxiliary, or extensive telephones onto pre-existing telephone circuits, so as to enable remote access to a particular telephone station. U.S. Pat. No. 3,949,172 discloses various of such systems, wherein household alternating current wiring is utilized to establish telephonic communication between a remote extension station and a master telephone circuit. The systems disclosed therein are not adaptable for use in a vehicular situation because of a lack of an electrical circuit which is common to both the vehicular telephone station and the exteriorly disposed telephone station. Therefore, there is yet a need for a system for establishing communication between an internal telephone system disposed within a motor vehicle and an external station.

The present invention, as will be described in greater detail hereinbelow provides a relatively small, inexpensive and portable interface unit adapted to be mounted upon an external portio of an automobile or other motor vehicle and capable of establishing a communication link between an internal telephone system and an externally disposed system. These and other features and advantages of the present invention will be apparent from the drawings, description and claims which follow:

SUMMARY OF THE INVENTION

There is disclosed herein a communication interface adapted to establish full duplex communication between a transceiver disposed within a vehicle and a handset of an externally disposed telephone. The interface includes a handset cradle adapted to be mounted on the vehicle and including support means adapted to receive nd retain the handset of the external telephone; receiver means adapted to receive information from the speaker of the external handset and provide an output signal corresponding thereto and transmit means adapted to receive an input signal from the transceiver and provide a signal corresponding thereto and convey that signal to the microphone of the handset. The interface further includes transmission means adapted to convey the output and input signals between the transceiver and the handset cradle.

The receiver means may include a microphone adapted to receive an acoustic signal from the handset and convert the acoustic signal to an electrical signal. In other embodiments, the receiver means includes an induction coil adapted to be disposed in close proximity to the speaker of the handset so as to sense the electrical current flowing through the speaker of the handset and generate an electrical signal corresponding to the acoustical signal output by the speaker. The receiver may include an amplifier adapted to amplify the output signal and may further include a gain control adapted to control the intensity of the amplified output signal. The transmit means may be adapted to receive an electrical input signal from the transceiver and provide an acoustic signal corresponding thereto, and the transmit means may further include an amplifier adapted to amplify the electrical signal prior to its conversion to an acoustic signal and may still further include a gain control adapted to control the output acoustic signal.

The support means may be configured so as to retain the speaker of the handset in close proximity to the receiver means and the microphone of the handset in close proximity to the transmit means. The interface may further include a strap or other mounting member for purposes of affixing the external receiver thereto. The handset cradle may include a clip adapted to removably mount it upon the window of a motor vehicle, whereas in other embodiments the cradle may be adapted for permanent mounting upon the external surface of a vehicle.

The transmission means may include an electrically conductive cable interconnecting the transceiver and the handset cable, whereas in other instances transmission means may comprise electromagnetic data link such as an infrared or radio frequency link adapted to convert the input and output signals to a form of electromagnetic energy capable of being propagated through free space.

The transceiver disposed within the vehicle may comprise a telephone handset, or a speaker phone such as one comprised of a separate speaker and microphone unit. It may be particularly advantageous in some instances to environmentally seal the handset cradle so as to prevent damage thereto from adverse environmental conditions.

BRIEF DESCRIPTIONS OF THE DRAWINGS

FIG. 1 is a perspective view of one particular communication interface structured in accord with the principles of the present invention and illustrating a handset cradle and telephone transceiver;

FIG. 3 is an illustration of a telephone transceiver adapted for use with the communication interface of the present invention;

DETAILED DESCRIPTION OF THE INVENTION

Figure 2:
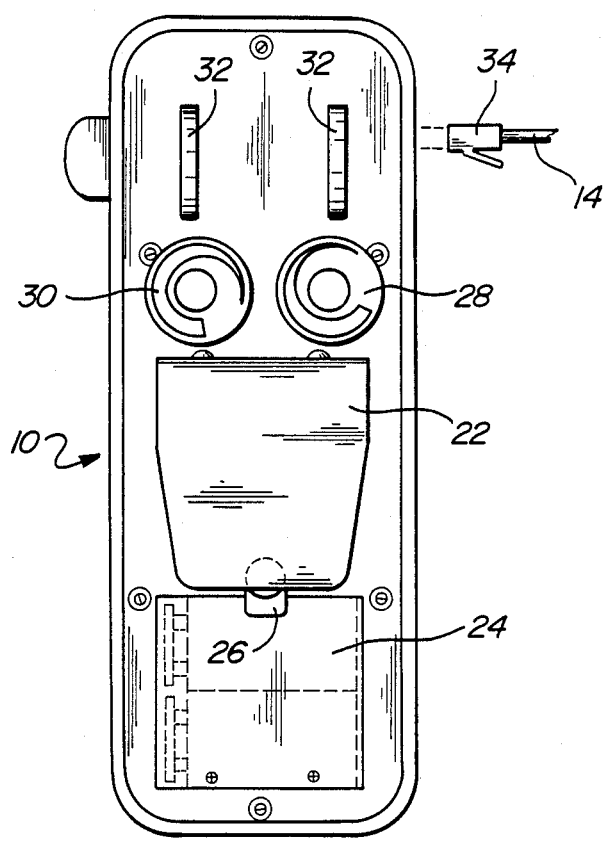
FIG. 2 is a plan view of the rear of a handset cradle generally similar to that illustrated in FIG. 1.

Referring now to FIG. 1, there is shown one particular embodiment of the present invention comprised of handset cradle 10, and as adapted to receive and retain the handset 12 of an externally disposed telephone and to convey signals from that handset via transmission means such as an electrical cable 14 to a separate transceiver, not shown. The handset cradle 10, which will be described in greater detail hereinbelow, a includes a pair of supporting rims 16 adapted to support the speaker and receiver of a telephone handset 12, so that a receiver and transmitter associated with the cradle 10 are proximate thereto. Cradle 10 further includes an ON/OFF switch 18 for inactivation of the circuitry thereof when the unit is not in use. As illustrated, the ON/OFF switch 18 is a toggle switch and is protected by a pair of protrusions 20 formed proximate thereto. It should be understood that other types of switch may be similarly employed. In one embodiment, one or more of the supporting rims 16 may have associated therewith a microswitch for purposes of activating the circuitry of the handset 10 when a telephone handset 12 is placed therein. As illustrated, the cradle 10 further includes a clip 22 for mounting of the cradle upon a vehicle surface; however, magnets, suction cups or other such mounting means may be similarly employed.

Referring now to FIG. 2, there is shown a back view of the handset cradle 10 of FIG. 1. Visible upon the rear surface thereof is the clip 22 as well as a battery compartment 24 provided with a closure latch 26 and adapted to hold one or more batteries for powering the circuitry thereof. The handset cradle includes a receiver circuit adapted to receive information from the speaker of an external handset and to provide an output signal, which may be conveyed to a transceiver disposed within the vehicle. The cradle also includes a transmit circuit adapted to receive an input signal from the transceiver disposed within the vehicle and provide an output signal corresponding thereto and convey that signal to the microphone of the external handset.

Owing to variations in particular pieces of telephone equipment, speaking conditions and the acuity of various users' hearing, it will generally be preferred that the interface of the present invention be provided with volume controls to regulate the volume of the signal transmitted from the handset to the transceiver in the vehicle and from the transceiver in the vehicle to the handset. Accordingly, the cradle shown in FIG. 2 includes a receive volume control 28 and a transmit volume control 30 disposed to so regulate such volume levels. As illustrated, the cradle 30 further includes a pair of molded-in support members 32 disposed so as to protect and prevent damage to the volume controls 28, 30 when the cradle 10 is mounted upon the surface of a vehicle. As will also be apparent from FIG. 2, the cradle is adapted to receive a standard telephone connector jack 34 having a cable 14 for establishing communication with a transceiver disposed within the vehicle.

Figure 5:
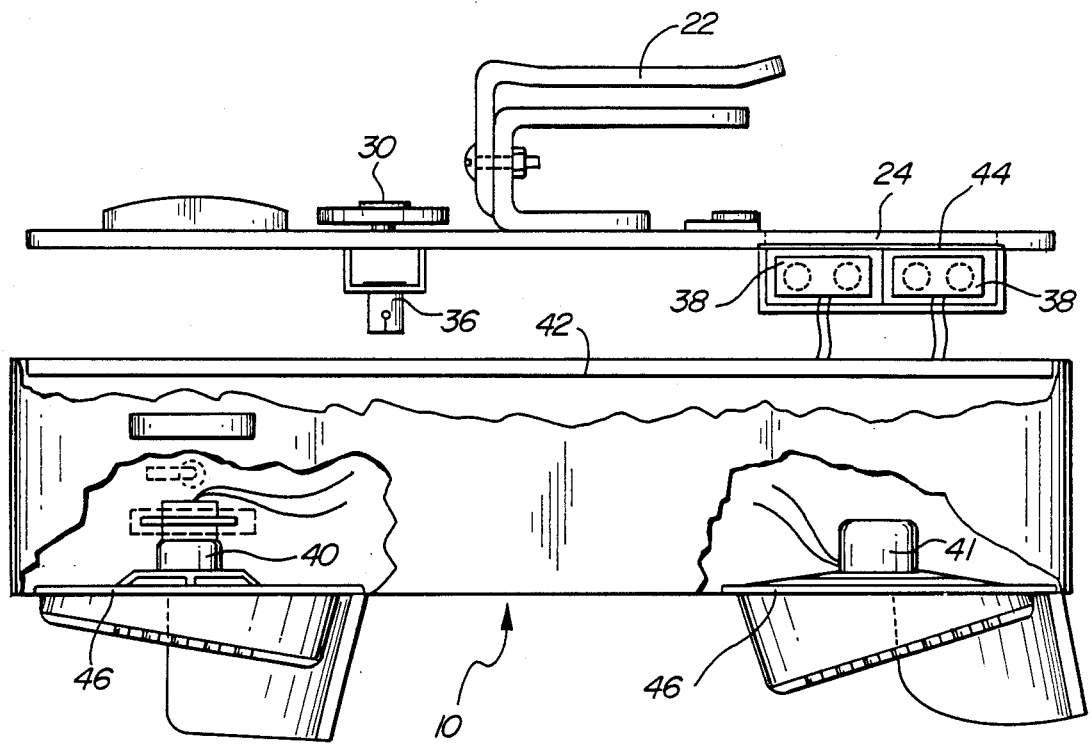
FIG. 5 is a side view of the handset cradle of FIG. 1 in cutaway and exploded form, illustrating various components thereof.

Referring to FIG. 5, there is shown a cross section, cutaway, exploded view of the cradle 10 of FIG. 1 better illustrating particular components thereof. As illustrated, the rear surface of the cradle 10 has been removed to better show the various components such as the volume knob 30 and the internal rheostat type switch 36 associated therewith; the mounting clip 22; the battery compartment 24 and the batteries 38 disposed therein.

The main portion of the handset cradle housing includes a receiver 40 adapted to receive information from the speaker of an externally disposed telephone handset and to provide an output signal corresponding thereto. Toward this end, the receiver 40 may comprise a microphone. However, it has been found particularly advantageous in the practice of the instant invention to employ an induction coil as a receiver insofar as an induction coil will not be sensitive to background noise.

As is well-known to those of skill in electrical arts, an induction coil is adapted to sense and receive the electromagnetic field associated with a changing electrical current and to provide an output signal corresponding thereto. The speaker of the external handset includes a magnetically driven coil therein which produces electromagnetic impulses as a result of the generation of sound. An induction coil, properly disposed, can receive these signals and convert them to an electrical output utilized to drive a downstream speaker. In this manner, an "electrical-to-electrical" link is established without the necessity for utilizing an acoustic signal. Thus, interference from background noise is obviated. This feature is particularly advantageous in consideration of the fact that the interface of the present invention is most ideally suited for use in a mobile environment where road noise and the like is a significant problem.

The cradle 10 also includes a transmit speaker 41 adapted to receive a signal emanating from a transceiver located in the vehicle and convert this signal to an acoustic signal which is received by the mouthpiece microphone of the external handset. As discussed previously, this speaker 41 may have associated therewith an amplifier and volume control.

In many instances, the interface of the present invention will be employed under harsh climatic conditions as, for example, in snowy, rainy or dusty environments. In fact, it is one advantage of the present invention that communication may be maintained between an outside public phone station and the interior of a motor vehicle without the necessity of exposure of occupants of the vehicle to an external environment. In order to prevent damage to the circuitry of the communication interface, it is advantageous that the handset cradle 10 be "ruggedized" so as to environmentally seal the circuitry therein. Toward this end, it is generally preferred that the back portion of the handset cradle be provided with a rubber sealing gasket 42 along its closing surface. Similarly, the battery compartment 24 will be provided with additional gasket 44 and volume controls 28, 30 will be weather-proof type controls as are well-known to those skilled in the art. It is further preferred that the receiver 40 and the transmitter 41 be protected by thin, impervious sound-transmissive membranes 46. In those instances where the receiver 40 is an induction coil, a sound-transmissive membrane may be dispensed with and the entire coil placed behind a solid surface.

Figure 4:
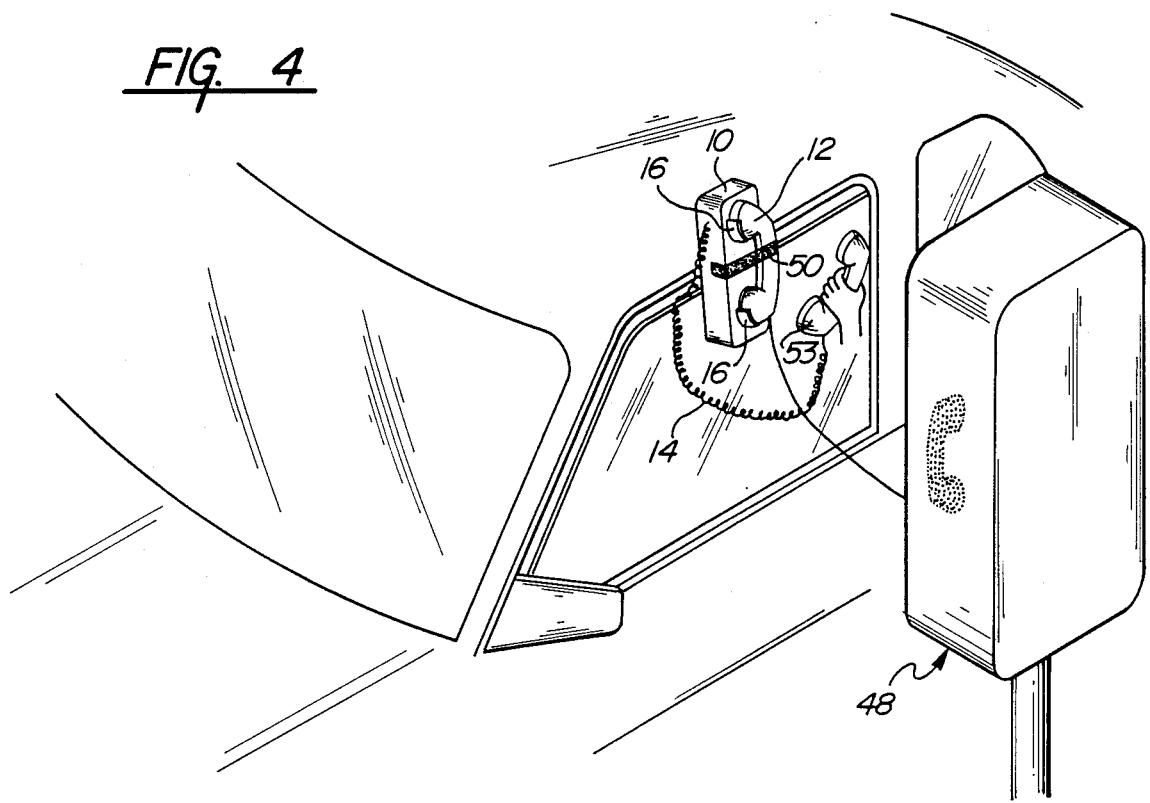
FIG. 4 is a perspective view illustrating one embodiment of the present invention as utilized in conjunction with a pay telephone.

The use of the interface is best illustrated with referenced to FIG. 4. In order to establish telecommunications between a pay phone station 48 and the interior of a motor vehicle, the driver first mounts the handset cradle 10 upon the window or other external portion of the motor vehicle. The handset 12 of the external telephone station is mounted in the receiver cradle 10 by supporting it with the support flanges 16.

In particular embodiments the handset cradle may further include a retaining member 50 associated therewith for purposes of firmly affixing the external receiver thereto. The affixing member 50 may be an elastic band having a snap or hook and loop type fastener for retaining the receiver 12. When the receiver is affixed, the electrical circuitry of the interface is activated. The controls are adjusted if necessary and the call is dialed via the pay phone station 48.

After the system is thus initialized, all further communication may take place from the interior of the vehicle. As shown in FIG. 4, a passenger inside the vehicle is holding a phone transceiver, in this instance a handset 53, which is interconnected to the handset cradle via a cable 14. Rather than utilizing a handset, it may be desirable in some instances to employ a speaker phone type transceiver within the automobile generally similar to that illustrated with reference to FIG. 3. Shown in the figure is a hands-free telephone transceiver comprised of a speaker unit 52 and a microphone unit 54 adapted to be interconnected to the handset cradle via cable 14. As will be appreciated by those of skill in the art, the hands-free transceiver of FIG. 3 is analogous to, and substitutes for a handset. The speaker portion 52 thereof is adapted to broadcast to all inhabitants of the interior of the vehicle, and the microphone portion 54 thereof is adapted to receive speech from all of the inhabitants. To enable access by all occupants, it is generally preferred that high volume speakers such as 8 ohm speakers be employed for the microphone and speaker portions. Obviously, other types of telephone systems may be similarly employed in conjunction with the interface of the present invention, the important feature being that the interface allows for establishment of communication an externally disposed receiver.

It should be noted that, while the transceiver within the motor vehicle is shown as interconnected to the handset cradle via transmission means which comprise a cable 14, other types of data link may be similarly employed. For example, the handset cradle may be adapted to convert incoming and outgoing signals to a form of electromagnetic radiation capable of being propagated through free space, and the transceiver may be similarly adapted to receive and send such transmissions. In this manner cordless communication may be established between the two. For example, a radio-frequency data link or an infrared may be employed in this manner.

Figure 6:
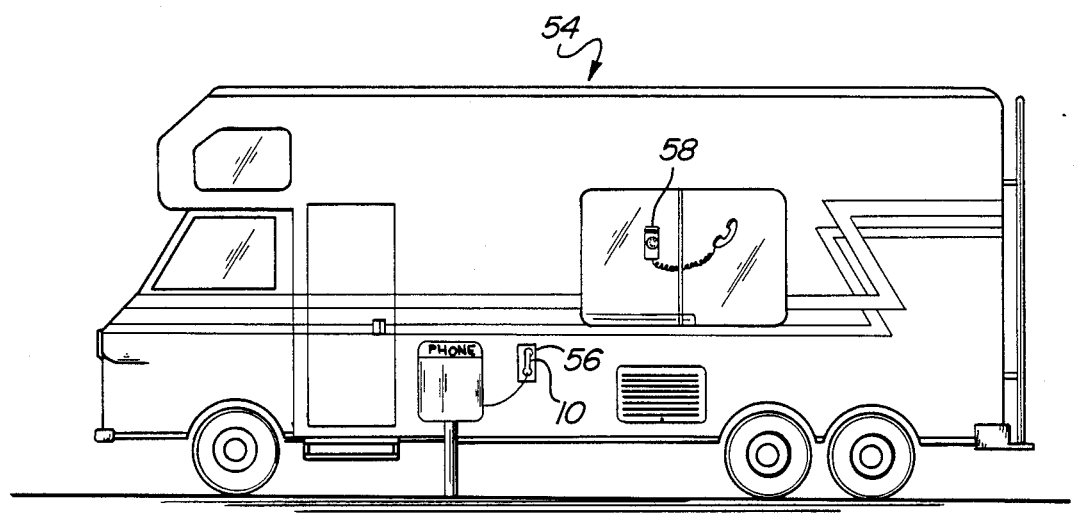
FIG. 6 is a perspective view of another embodiment of the present invention adapted for use in a motor home.

The present invention has been described with reference to a handset cradle adapted for temporary mounting upon the external surface of a vehicle, obviously the invention is not so limited and includes embodiments wherein the external surface of a vehicle includes a permanently mounted handset cradle for communication purposes. Such a cradle may be disposed behind a weather sealed door or may be formed integrally with a portion of the external body. Referring now to FIG. 6, there is shown one such permanently mounted embodiment as adapted to establish telephonic communication in a motor home.

Obviously, it would be desirable to conduct telephone calls from the interior of a motor home. However, vehicular pay phone stations are mounted so as to preclude ready communication therefrom. By employing a handset cradle such as illustrated herein, it will be appreciated that convenient telecommunication from a transceiver station disposed within a motor home may be readily established. As shown, a motor home 54 includes a handset cradle station 56 formed upon the exterior surface thereof. The cradle station 56 may comprise a recess in the body of the motor home and may further include a sealed, locking door to prevent unauthorized tampering therewith.

In the illustrated embodiment, the handset cradle 10 disposed within the station 56 is generally similar in function to that previously described and is adapted to establish communication with a telephone station 58 disposed within the motor home. While in the previously described embodiment, the volume controls and ON/OFF switches were described as being located on the body of the handset cradle, it would obviously be more desirable in the embodiment of FIG. 6 to locate such controls on the interior of the motor home, as for example in conjunction with the telephone station 58. Such modification is obviously well within the ability of one of skill in the art and may be readily accomplished without undue experimentation. Furthermore, the embodiment of FIG. 6 will preferably include a connecting cable or similar transmission means permanently mounted within the motor home for establishing communication between the cradle 10 and the station 56. Similar principles may be employed to establish communication with a telephone station within a truck.

Figure 7:
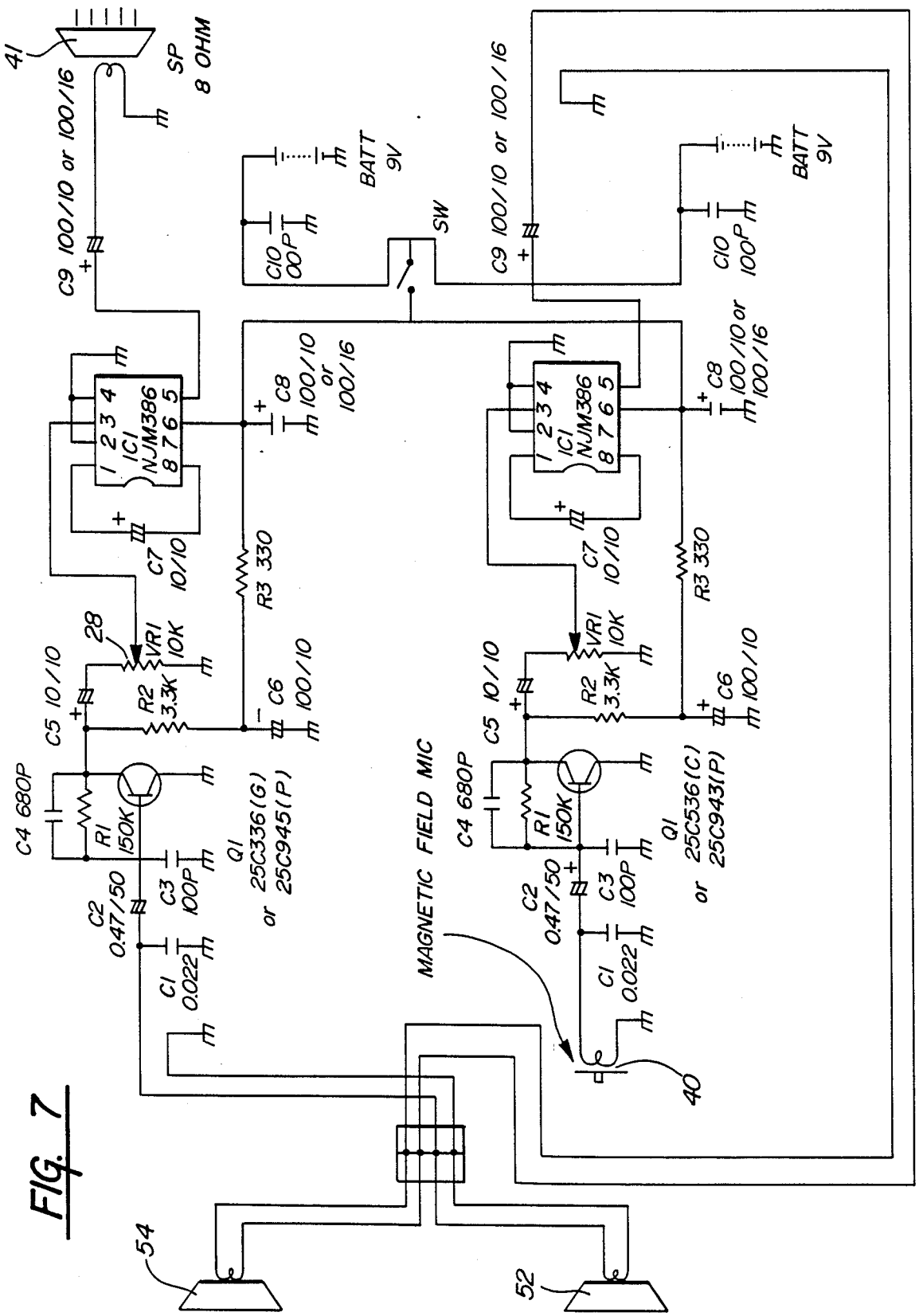
FIG. 7 is a schematic diagram of one particular circuit which may be used in conjunction with the present invention.

In light of the foregoing description there will obviously be many variation of the present invention obvious to one of skill in the art and accordingly, there will be many designs for electrical circuitry able to accomplish the present invention. Referring now to FIG. 7, there is shown one particular schematic diagram for a communication interface structured in accord with the principles of the invention. As shown in the schematic diagram of FIG. 7, the communication interface includes an inductive pickup of the type generally referred to as a magnetic field microphone 40 adapted to receive sound from the speaker of an external pay phone. The signal produced by the inductive pickup is appropriately amplified and filtered and transmitted to speaker 52 of the vehicle handset transceiver. Such amplification is generally accomplished by a simple monolithic amplifier such as an NJM 386 integrated circuit. As illustrated, the receive circuit has associated therewith a variable resistor 30 for controlling the volume at the speaker 52.

The transmit circuit for carrying signals from the transceiver to the external telephone is basically a copy of the receive circuit and is operated so as to take an input from the transceiver microphone 54, which in this instance is shown as an 8 ohm speaker being operated as a microphone, and amplify that signal and provide it to a transmit speaker 41 maintained in proximity to the external telephone receiver.

It should be kept in mind that numerous variations and modifications of the foregoing may be made in accord with the principles of the present invention. For example, one of skill in the art may readily make substitutions for various of the electrical components. Similarly, the size, shape and mounting of the handset cradle may be varied and the invention may be readily adaptable for use in other types of environments such as aquatic vehicles, aircraft and the like. For this reason, it will be understood that the foregoing drawings and description are illustrative of some particular embodiments of the instant invention and are not meant to be limitations upon the practice thereof. It is the following claims, including all equivalents, which define the scope of the invention.

I claim:

1. A communication system adapted to establish full duplex communication between the interior environment of a vehicle and a handset of an externally disposed telephone, said system including:
   (A) a transceiver disposed within the vehicle and including a microphone for receiving vocal input from a user and providing an electrical signal corresponding thereto and a speaker for receiving an electrical signal and providing an audible output corresponding thereto;
   (B) a handset cradle configured to include a mounting clip for retaining said cradle on the window of the vehicle and including:
      (1) support means adapted to receive and retain the handset of said external telephone;
      (2) receiver means adapted to receive information from the speaker of the handset and provide an electrical output signal corresponding thereto;
      (3) transmit means adapted to receive said electrical input signal corresponding to the vocal input to the transceiver, provide a signal corresponding thereto and convey that signal to the microphone of the handset;
   (C) transmission means adapted to convey said input and output signals between said transceiver and said handset cradle.

2. An interface as in claim 1, wherein said receiver means includes a microphone adapted to receive an acoustic signal from the speaker of the handset and to convert said acoustic signal into an electrical signal.

3. An interface as in claim 1, wherein said receiver means includes an induction coil adapted to be disposed in close proximity to the speaker of the handset so as to sense the electrical current flowing through the speaker and generate an electrical signal corresponding to the acoustic signal output by said speaker.

4. An interface as in claim 1, wherein said receiver means further includes an amplifier adapted to amplify the output signal.

5. An interface as in claim 4, wherein said amplifier further includes a gain control adapted to control the intensity of the amplified output signal.

6. An interface as in claim 1, wherein said transmit means is adapted to receive an electrical input signal from the transceiver and provide an acoustic signal corresponding thereto.

7. An interface as in claim 6, wherein said transmit means further includes an amplifier adapted to amplify the electrical input signal prior to its conversion to an acoustic signal.

8. An interface as in claim 7, wherein said amplifier further includes a gain control adapted to control the volume of the output acoustic signal.

9. An interface as in claim 1, wherein said support means is further adapted to retain the speaker of the handset in relatively close proximity to the receiver means, and to retain the microphone of the handset in relatively close proximity to the transmit means.

10. An interface as in claim 1, wherein said handset cradle further includes an attachment to retain the external handset.

11. An apparatus as in claim 1, wherein said transmission means includes an electrically conductive cable interconnecting the transceiver and the handset cradle.

12. An apparatus as in claim 1, wherein said transmission means comprises an electromagnetic data link having transducer means adapted to convert said input and output signals to a form of electromagnetic energy capable of being propagated through free space.

13. An interface as in claim 12, wherein said transducer is adapted to convert the input and output signals to radio-frequency energy.

14. An interface as in claim 12, wherein said transducer is adapted to convert the input and output signals to infrared energy.

15. An interface as in claim 1, wherein said transceiver disposed within the vehicle comprises a telephone handset.

16. An interface as in claim 1, wherein said transceiver disposed with the vehicle includes a separate speaker and microphone unit.

17. An interface as in claim 1, wherein said handset cradle is environmentally sealed, whereby damage thereto by adverse environmental conditions is substantially prevented.

18. A communication interface adapted to establish full duplex communication between a transceiver disposed within a vehicle and a handset of an externally disposed telephone, said interface including:

(A) a handset cradle permanently mounted on an exterior surface of the vehicle and including;
  (1) a support adapted to receive and retain the handset of the external telephone;
  (2) a receiver adapted to receive information from the speaker of the handset and provide an outgoing electrical signal and corresponding thereto;
  (3) an output amplifier adapted to amplify the output signal, said amplifier including a gain control whereby the magnitude of said amplified signal may be controlled;
  (4) a transmitter adapted to receive an electrical input signal from the transceiver, amplify said signal, provide an output acoustic signal corresponding thereto and convey that acoustic signal to the microphone of the handset, said transmitter including a gain control whereby the amplitude of the acoustic signal may be controlled; and (B) transmission means interconnecting the handset cradle and the transceiver and adapted to carry said input and output electrical signals therebetween.

* * * * *